W. J. GRUBE.
ARTIFICIAL BAIT.
APPLICATION FILED MAY 9, 1917.
1,247,955.
Patented Nov. 27, 1917.
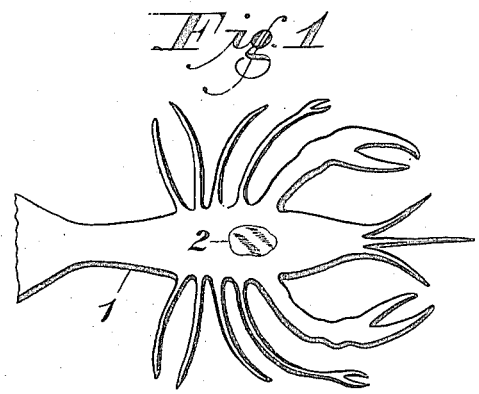
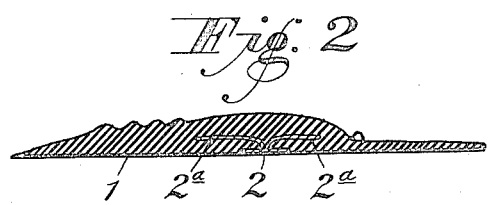
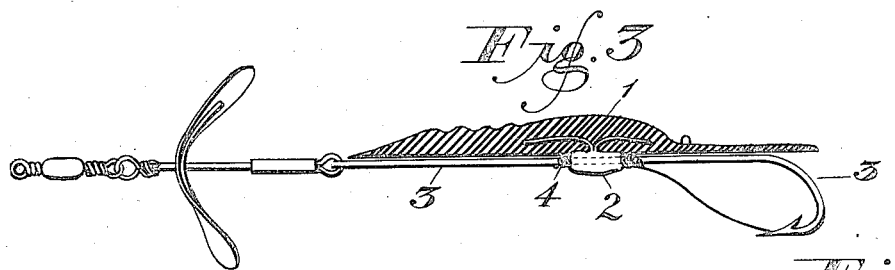
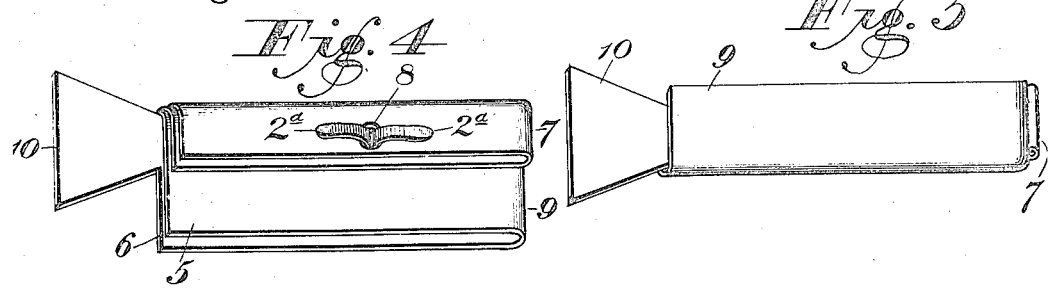
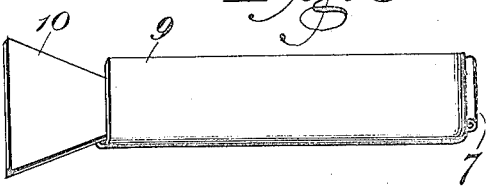
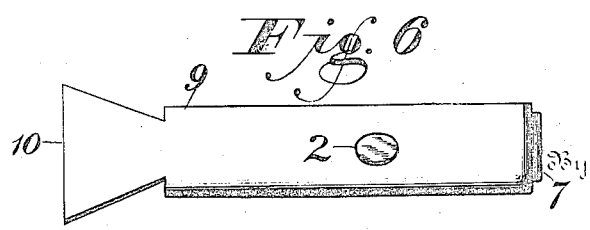
Inventor
W. J. Grube
By E. E. Overholt
Attorney

UNITED STATES PATENT OFFICE.

WILLIAM J. GRUBE, OF DELAWARE, OHIO.

ARTIFICIAL BAIT.

1,247,955.   Specification of Letters Patent.   Patented Nov. 27, 1917.

Application filed May 9, 1917. Serial No. 167,498.

*To all whom it may concern:*

Be it known that I, WILLIAM J. GRUBE, a citizen of the United States, residing at Delaware, in the county of Delaware and State of Ohio, have invented certain new and useful Improvements in Artificial Bait, of which the following is a specification.

My invention relates to artificial bait for fish, and more specifically to bait of this character provided with novel means for securing the same upon the hook with which it is to be used.

My principal object is to provide a bait of this character with a piece of metal securely embedded therein in position for the hook to be easily secured thereto either by soldering or otherwise.

An important feature of the invention consists in molding the bait with a piece of metal embedded therein which has an exposed face at the point where it is desired to secure the bait to the hook, said exposed face being adapted to be secured to the hook preferably by soldering.

The invention consists in the novel construction and combination of its parts as will be hereinafter described and claimed, reference being had to the accompanying drawings, in which Figure 1 is a bottom plan view of a rubber crawfish constructed in accordance with the principles of my invention. Fig. 2 is a longitudinal section of Fig. 1. Fig. 3 is a longitudinal section showing one half of the rubber portion of the bait cut away with the metallic portion thereof left intact and soldered to a fish hook. Fig. 4 shows a piece of adhesive rubber partly folded preparatory to being placed in the mold preparatory to forming an artificial crawfish; said piece of rubber having an ordinary paper fastener properly secured therein to form the metallic portion of the bait. Fig. 5 shows the piece of rubber further folded and ready for the mold; and Fig. 6 is a bottom plan view of Fig. 5.

The numeral 1 indicates a rubber crawfish provided with a piece of metal 2 securely embedded therein and having its under face exposed and flush with the under surface of the crawfish. This piece of metal is provided with projections 2ᵃ which extend in opposite directions in the body of the crawfish, to cause the same to be firmly anchored in said body.

The bait is secured in the fish hook 3 by simply soldering the hook to the exposed face of the piece of metal 2, as indicated in Fig. 3. The operation is performed by laying the shank of the hook on the exposed face of the piece of metal and then taking a small portion of solder and melting it onto the hook and said exposed face of the piece of metal, thus embedding the shank of the hook at that point in the solder which has become an integral part, so to speak, of the embedded piece of metal.

In order to insure the hook against longitudinal movement in the solder, I wrap a short piece of wire very tightly around the shank of the hook at the point where it is to be embedded in the solder, just before the soldering operation takes place.

Of course, the piece of metal 2 may be secured to the rubber bait in any other suitable way as well as by molding the rubber onto the metal; and the piece of metal may be made in any desired shape adapted to firmly engage the rubber body of the bait. The hook may also be secured to the piece of metal by other means than soldering if desired.

In Fig. 4 I have shown (partly folded) a piece of adhesive rubber such as I frequently employ for making a rubber crawfish. Here the end 5 of the piece of rubber has first been folded over to meet the end 6, and then the two thicknesses of material thus formed are again folded upon each other at the upper side of the piece, thus forming the fold 7 at that side. The four plies thus formed are then provided with a perforation 8 through which is passed the two shanks 2ᵃ of a common metallic paper fastener, which shanks are bent apart into flat engagement with the upper side of the fold 7.

Fig. 5 shows the lower side or double ply 9 of the piece of rubber folded over upon the double ply 7, thus covering up the shank 2ᵃ of the paper fastener 2. As the rubber used is preferably adhesive rubber, the plies when folded upon each other and firmly pressed together, will stick to each other, and not come unfolded.

The object of placing the paper fastener 2 in the rubber as shown in Fig. 4 is simply to embed the piece of metal in the rubber; for though it incidentally serves to hold the plies of rubber together, yet they adhere to each other sufficiently to hold together of themselves as just pointed out above.

The piece of rubber is provided at its left end with a projection 10 which serves to form the tail of the crawfish.

Fig. 6 is a view of the underside of Fig. 5, and shows the head of the paper fastener as it appears in the folded piece of rubber when the same is ready for the mold.

Having now described my invention, what I claim as new and desire to secure by Letters Patent is:—

1. An artificial bait comprising an elongated elastic member and a piece of metal embedded therein having a body portion provided with branches extending longitudinally of the elastic member and in opposite directions from each other, said body portion being exposed at one side of the elastic member to adapt the body portion for engagement with a fish hook.

2. In a device of the character described, an artificial bait comprising an elongated elastic member; and a piece of metal embedded therein having a body portion provided with branches extending longitudinally of the elastic member and in opposite directions from each other, said body portion being exposed at one side of said elastic member; a hook at said side of the bait where the metal is exposed; and a portion of solder uniting the hook with said exposed piece of metal.

3. A device of the character described comprising an elongated piece of yielding material and a piece of metal having a body portion provided with branches, said piece of metal being embedded in the yielding portion with its branches extending longitudinally thereof and in opposite directions from each other and with its body portion exposed at the under side of the yielding portion; and a hook rigidly secured to the exposed part of said body portion; the longitudinal reach of the branches, the longitudinal extent of the hook and also of the yielding portion of the device all being in the same direction.

In testimony whereof I affix my signature in the presence of two witnesses.

WILLIAM J. GRUBE.

Witnesses:
 GEO. C. SNYDER,
 FRANCES WACHTER.